UNITED STATES PATENT OFFICE.

MAX ENGELMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

NEW PURIN BASES.

955,587.     Specification of Letters Patent.     Patented Apr. 19, 1910.

No Drawing.    Application filed January 6, 1909. Serial No. 470,947. (Specimens.)

*To all whom it may concern:*

Be it known that I, MAX ENGELMANN, doctor of philosophy, chemist, citizen of the German Empire, residing at Elberfeld Kingdom of Prussia, Germany, have invented new and useful Improvements in New Purin Bases, of which the following is a specification.

My invention relates to the production of new purin bases with alkaline reaction and processes of making them from halogen acyl derivatives of ortho-diaminopyrimidins, which have been hitherto unknown.

I have found that by treating the ortho (4.5) diaminopyrimidins of the general formula:

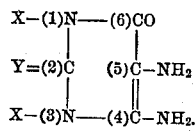

(X stands for H or alkyl, Y for O, NH, S or =N—CN) with halogen substituted carboxylic acids e. g. monochloracetic acid, chlorlactic acid etc. or with derivatives thereof the hitherto unknown halogen acyl derivatives of ortho-diaminopyrimidins are obtained (the halogen acyl group replacing H of the $NH_2$ group in position 5) which probably have the following general formula:

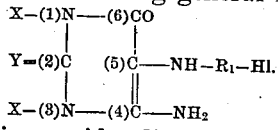

in which R is an acid radical and Hl a halogen.

For producing the new compounds the ortho-diaminopyrimidins are heated with the halogen substituted carboxylic acids with or without the addition of diluents or solvents. The products thus obtained are valuable intermediate compounds for the production of other pyrimidin compounds and of purin compounds.

The new 5-halogen-acyl derivatives of ortho-diaminopyrimidins react with ammonia or organic bases e. g. in the following way:

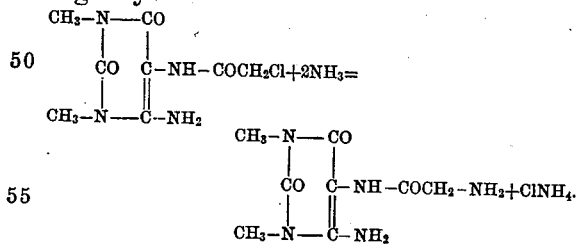

On treating the latter compounds with alkaline condensing agents water is eliminated and new purin derivatives are obtained. The reaction takes place e. g. in the following way:

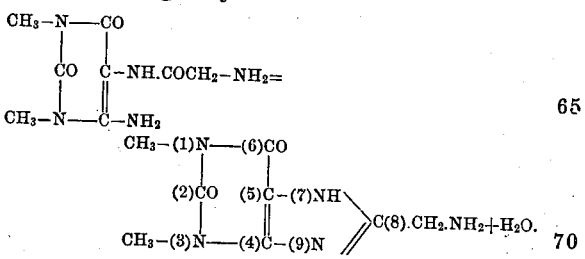

1.3-dimethyl-8-aminomethylxanthin is thus obtained from 1.3-dimethyl-4.5-diamino-2.6-dioxypyrimidin. The purin derivatives thus obtained are valuable therapeutic compounds possessing an excellent diuretic action. They are crystalline compounds being soluble in alkalies, water, alcohol and ether. They are bases with alkaline reaction which contain in their molecule an unchanged amido group. They form salts with acids which do not undergo hydrolysis on treatment with water.

In order to illustrate my new process more fully the following example is given, the parts being by weight:

*5 - chloracetylamino - 1.3 - dimethyl - 2.6 - dioxy-4-aminopyrimidin.*—40 parts of 1.3-dimethyl-2.6-dioxy-4.5-diaminopyrimidin are well mixed with 35 parts of monochloracetic acid and the mixture is heated to 120° C. for 25 minutes. The product of the reaction which on cooling forms a solid mass is then recrystallized from boiling water. It forms white crystals melting at 210° C. soluble in hot water and more difficultly soluble in alcohol and ammonia. Other diaminopyrimidins can be used e. g. 2.6-dioxy-4.5-diaminopyrimidin, 3-methyl-2.6-dioxy-4.5-diaminopyrimidin, 2-thio-6-oxy-4.5-diaminopyrimidin, 2-cyanimino-6-oxy-4.5-diaminopyrimidin, 2-imino-6-oxy-4.5-diaminopyrimidin.

Instead of monochloracetic acid other halogen substituted carboxylic acids can be used, e. g. beta-chlorlactic acid, dichloracetic acid, bromophenylacetic acid, beta-iodo-propionic acid or their derivatives, such as anhydrids, acid halogenids etc. may be used. The product obtained from beta-chlorlactic acid and 1.3-dimethyl-2.6-dioxy-4.5-diaminopyrimidin melts at 215° C.

*5-aminoacetylamino-1.3-dimethyl-2.6-dioxy-4-aminopyrimidin.*—200 parts of the chloracetyldiaminopyrimidin and 1000 parts of ammonia (30 per cent.) are heated in an autoclave to 50° C. for 10 hours. The excess of ammonia and water is distilled off and the residue is treated with 500 parts of a 90 per cent. alcohol. The new aminoacetylpyrimidin remains undissolved in a practically pure state. It forms white needles melting at 220° C. and is soluble in hot water, easily soluble in alkalies and acids and difficultly soluble in alcohol and ether.

The process is carried out in an analogous manner on using organic bases instead of ammonia. The product obtained from 5-chloracetylamino-1.3-dimethyl-4-amino-2.6-dioxypyrimidin (M. Pt. 210°) and piperidin forms prisms which melt at 98° C. The product obtained from 5-beta-chloro-alpha-oxy-propionyl-amino-1.3-dimethyl-4-amino-2.-6-dioxypyrimidin (M. Pt. 215°) and dimethylamin forms crystals melting at 228° C. It is very easily soluble in water and almost insoluble in alcohol and ether. The condensation product obtained from 5-chloracetylamino-3-monomethyl-4-amino-2.6-dioxypyrimidin (M. Pt. 225°) and anilin forms crystals melting at 275° C.

*1.3-dimethyl-8-aminomethylxanthin.*— To 120 parts of 5-aminoacetylamino-1.3-dimethyl-2.6-dioxy-4-aminopyrimidin 100 parts of a 30 per cent. caustic soda lye are added and the mixture is evaporated almost to dryness on the water bath. The residue is dissolved in water and the 8-aminomethyl-1.3-dimethylxanthin is precipitated from the aqueous solution by passing carbonic acid gas into the solution. After crystallization from water it melts at 252° C. It is easily soluble in alkalies, soluble with difficulty in cold water and alcohol, ether and chloroform.

The 1.3-dimethyl-8-dimethylaminomethylxanthin crystallizes from alcohol in the shape of white crystals melting at 180° C. and the 1.3-dimethyl-8-piperidylmethylxanthin forms colorless needles melting at 203° C.

The new purin derivatives are therapeutically valuable products and possess an excellent diuretic action superior to that of theophyllin, the most efficient of the known diuretica. Useful doses are from ½ to 1 gram but the quantity should always be decided by the attending physician. They are easily soluble bases with alkaline reaction which contain in their molecule an unchanged amido group. They form salts with acids which do not undergo hydrolysis on treatment with water.

Having now described my invention and in what manner the same is to be performed, I declare that what I claim is:

1. The herein-described new purin bases obtainable by reacting between ortho-diaminopyrimidins and halogen-substituted carboxylic acids, which are crystalline compounds, soluble in alkalies, water, alcohol and ether, characterized by the presence of an unchanged amido group in their molecule, forming salts with acids which do not undergo hydrolysis on treatment with water, exhibiting valuable therapeutic properties and having probably the following general formula:

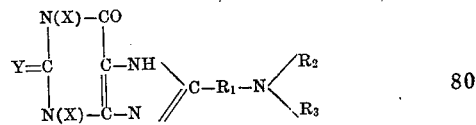

in which X may be hydrogen or alkyl; Y oxygen, sulfur, the imino-, or cyan-imino radical; $R_1$ alkyl; $R_2$ and $R_3$ hydrogen, alkyl or aryl-radical substantially as hereinbefore described.

2. The herein-described 1.3-dimethyl-8-aminomethylxanthin of the formula:

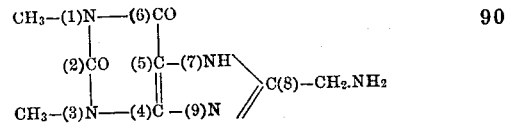

which is a crystalline compound melting at 252° C., easily soluble in alkalies, soluble with difficulty in cold water and alcohol, ether and chloroform; forming salts with acids; and exhibiting valuable therapeutic properties, substantially as hereinbefore described.

In testimony whereof I have hereunto set my hand in the presence of two subscribing witnesses.

MAX ENGELMANN. [L. S.]

Witnesses:
 Otto König,
 Walter E. Nilskamp.